(12) United States Patent
Peper

(10) Patent No.: US 6,978,893 B2
(45) Date of Patent: Dec. 27, 2005

(54) INFLATABLE PACKAGING SYSTEM

(75) Inventor: William A. Peper, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 248 days.

(21) Appl. No.: 10/295,625

(22) Filed: Nov. 15, 2002

(65) Prior Publication Data

US 2003/0094395 A1 May 22, 2003

Related U.S. Application Data

(60) Provisional application No. 60/332,185, filed on Nov. 16, 2001.

(51) Int. Cl.[7] .............................................. B65D 81/03
(52) U.S. Cl. ........................... 206/522; 383/3; 206/521
(58) Field of Search ................................. 206/521, 522, 206/584, 591, 592; 410/119; 383/3, 44, 58, 383/109, 110, 116; 5/644, 706, 712

(56) References Cited

U.S. PATENT DOCUMENTS

| | | | |
|---|---|---|---|
| 611,585 A * | 9/1898 | Andres | ........................... 5/706 |
| 3,038,593 A | 6/1962 | Root et al. | |
| 3,523,563 A | 8/1970 | Mirando | |
| 4,044,867 A | 8/1977 | Fisher | |
| 4,155,453 A | 5/1979 | Ono | |
| 4,190,158 A | 2/1980 | Ambrose | |
| 4,240,556 A | 12/1980 | Field | |
| 4,262,801 A | 4/1981 | Avery | |
| 4,551,379 A | 11/1985 | Kerr | |
| 4,551,874 A * | 11/1985 | Matsumura et al. | ........... 5/630 |
| 4,597,244 A | 7/1986 | Pharo | |
| 4,705,085 A | 11/1987 | Brown | |
| 4,793,123 A | 12/1988 | Pharo | |
| 4,847,126 A | 7/1989 | Yamashiro et al. | |
| 4,872,558 A | 10/1989 | Pharo | |
| 4,874,093 A | 10/1989 | Pharo | |
| 4,917,646 A | 4/1990 | Kieves | |
| 4,918,904 A | 4/1990 | Pharo | |
| 4,949,530 A | 8/1990 | Pharo | |
| 4,969,312 A | 11/1990 | Pivert et al. | |
| 5,009,318 A | 4/1991 | Lepinoy | |
| 5,042,663 A | 8/1991 | Heinrich | |
| 5,263,587 A | 11/1993 | Elkin et al. | |
| 5,272,856 A | 12/1993 | Pharo | |
| 5,340,632 A | 8/1994 | Chappuis | |
| 5,351,828 A | 10/1994 | Becker et al. | |
| 5,427,830 A | 6/1995 | Pharo | |
| 5,445,274 A | 8/1995 | Pharo | |
| 5,447,235 A | 9/1995 | Pharo | |
| 5,487,470 A | 1/1996 | Pharo | |
| 5,588,532 A | 12/1996 | Pharo | |
| 5,711,691 A | 1/1998 | Damask et al. | |
| 6,283,296 B1 | 9/2001 | Newman | |
| 2003/0096068 A1 * | 5/2003 | Peper | ........................ 428/34.1 |

FOREIGN PATENT DOCUMENTS

BE 637711 1/1964

(Continued)

Primary Examiner—David T. Fidel
(74) Attorney, Agent, or Firm—Trisha D. Adamson; George W. Jonas

(57) ABSTRACT

An inflatable packaging system comprised of an inflation channel that feeds a plurality of inflatable cells prevents buckling of the inflation header as the inflatable cells inflate by relieving stress along a seal line that separates the inflation header from the inflatable cells.

1 Claim, 11 Drawing Sheets

FOREIGN PATENT DOCUMENTS

| | | |
|---|---|---|
| DE | 1141941 | 12/1962 |
| DE | 1486391 | 12/1969 |
| DE | 28 24 397 | 12/1978 |
| EP | 0 637 711 B1 | 8/1995 |
| EP | 0 637 711 | 3/1997 |
| FR | 1443340 | 5/1965 |
| FR | 2 067 530 | 8/1971 |
| FR | 2067530 | 8/1971 |
| FR | 2291114 | 11/1976 |
| FR | 2 602 175 * | 2/1988 |
| GB | 1179466 | 1/1970 |
| GB | 2 228 193 A * | 8/1990 |
| JP | 07165266 | 6/1995 |
| JP | 08034478 | 6/1996 |
| JP | 09012061 | 1/1997 |
| JP | 11236075 | 8/1999 |
| JP | 20020373471 | 2/2002 |
| WO | WO 02/079054 A1 | 10/2002 |

* cited by examiner

US 6,978,893 B2

INFLATABLE PACKAGING SYSTEM

REFERENCE TO CO-PENDING APPLICATIONS

This application claim the benefit of U.S. provisional patent application Ser. No. 60/332,185, filed Nov. 16, 2001 by Kevin W. Anderson et al.

BACKGROUND OF THE INVENTION

The present invention generally relates to inflatable packaging. In particular, the present invention relates to low profile inflatable packaging systems with improved perimeter protection, integrity and inflatability.

Inflatable packaging systems having opposing inflatable members sealed relative to one another to form an envelope like package are known to provide protection for relatively flat items being shipped or otherwise transported. The known inflatable packaging systems, however, do not provide ample perimeter protection for such items. There is a need for an inflatable envelope-like packaging system with improved perimeter protection.

Check valves for a single inflatable member are known. Also known are inflatable packaging systems having multiple inflatable cells. There is a continuing need for check valves that can be easily incorporated into each inflatable cell of a multiple cell packaging system to ensure the integrity of the packaging system in the event of a leak in one region of the packaging.

Inflatable packaging systems having multiple cells that extend transverse from a common inflation header are subject to inflation difficulties. As the cells fill with inflation medium, the width of each cell decreases. The additive effect of multiple cells inflating and decreasing in width causes a strain on the seal separating the cells from the inflation header. The result of this strain is a buckling of the inflation header that can inhibit or even prevent an inflation medium from traveling to cells distant from the point of buckling. There is a need for an multi-cell inflatable packaging system that improves the flow path for an inflation medium through a header to the multiple cells.

SUMMARY OF THE INVENTION

The inflatable packaging system of the present invention has first and second film layers sealed together around a perimeter of the respective layers except for a gap. The gap serves as an entrance for an inflation medium to an interior defined between the first and second film layers. Communicating with the gap is an inflation channel formed by a first seal of the first and second film layers adjacent to a portion of the perimeter. The inflation channel carries an inflation medium to a plurality of inflatable cells, each of which is in communication with the inflation channel. The plurality of inflatable cells are formed by a plurality of spaced second seals that extend from and are transverse to the first seal. The inflatable packaging system comprises means for maintaining airflow through the inflation channel as the plurality of inflatable cells are inflated.

BRIEF DESCRIPTION OF THE DRAWINGS

FIGS. 15 and 16 are cross-sectional views of alternate constructions of the packaging systems of FIGS. 12–14 utilizing a one way valve of FIGS. 5–5a.

Figure 1:
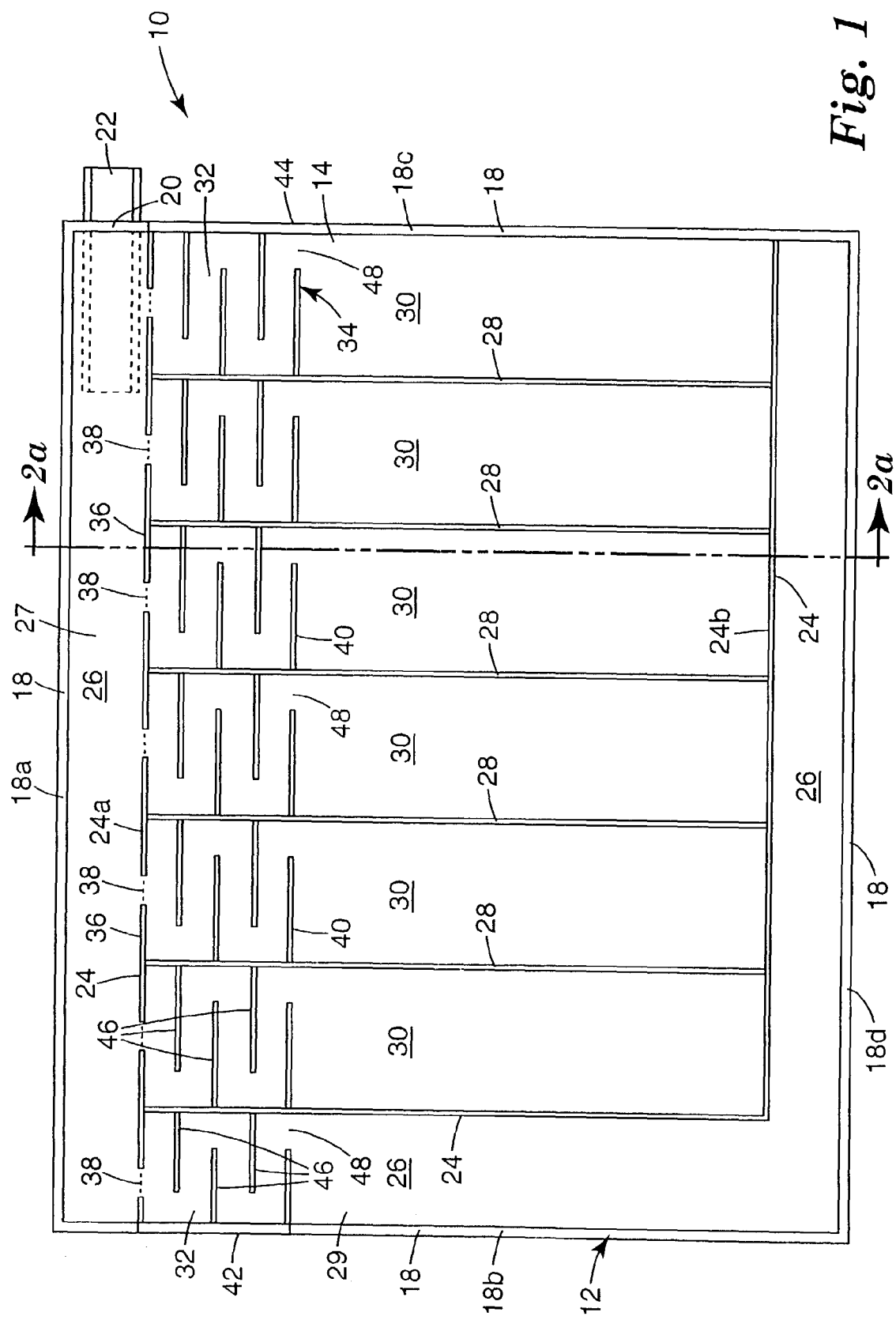
FIG. 1 is a top schematic view of an inflatable member of the present invention.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale as it has been necessary to enlarge certain portions for clarity. Throughout the embodiments, like reference numerals are used for like elements.

DETAILED DESCRIPTION OF THE PREFERRED EMBODIMENTS

Packaging system 10 of the present invention is generally shown in FIG. 1. Packaging system 10 is comprised of an inflatable member 12 formed of overlaying first and second layers 14 and 16 (See FIG. 2) of a flexible polymeric material. Opposing peripheral edge surfaces of layers 14 and 16 are interconnected by a perimeter heat seal 18. A small peripheral section 20 of layers 14 and 16 is left unsealed to provide for a check valve 22, such as is commonly known in the art. Suitable check valves are disclosed, for example, in U.S. Pat. Nos. 4,917,646 and 5,711,691.

Spaced from perimeter heat seal 18 along three sides of inflatable member 12, a heat seal 24 interconnects layers 14 and 16 to define a peripheral inflatable chamber 26 of inflatable member 12, with inflation valve 22 communicating with a first section 27 of inflatable chamber 26. Layers 14 and 16 are further interconnected by heat seals 28, which extends between heat seal segments 24a and 24b, to define a series of inflatable cells 30 of inflatable member 12 of packaging system 10. Each inflatable cell 30 communicates with first section 27 of inflatable chamber 26, such as via an interruption of heat seal segment 24a.

Figure 2:
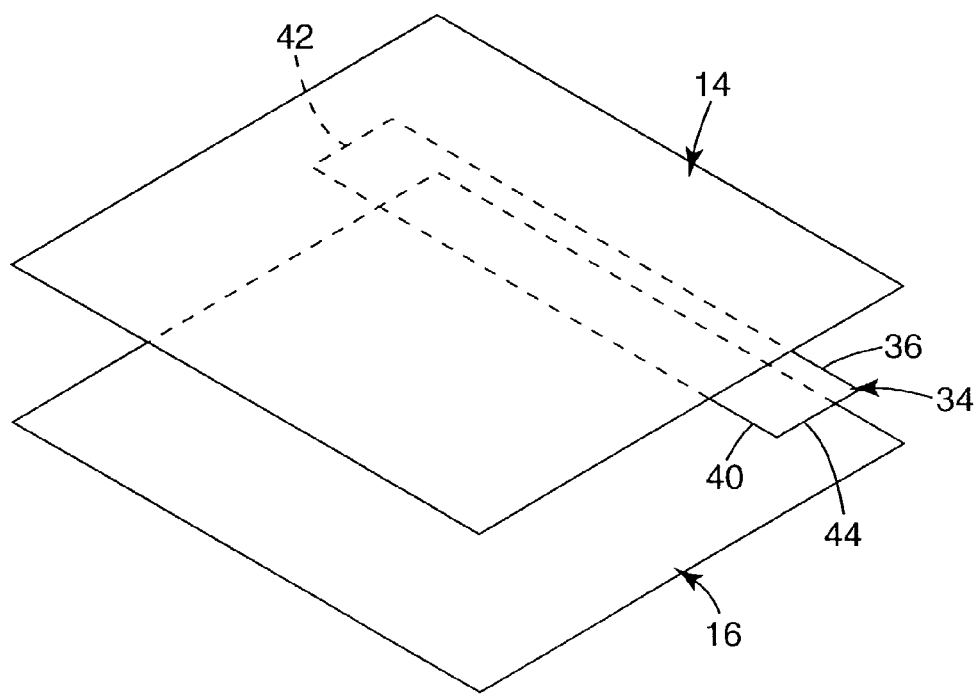
FIG. 2 is an exploded perspective view of the film layer orientation for the inflatable member of FIG. 1.
Figure 2A:
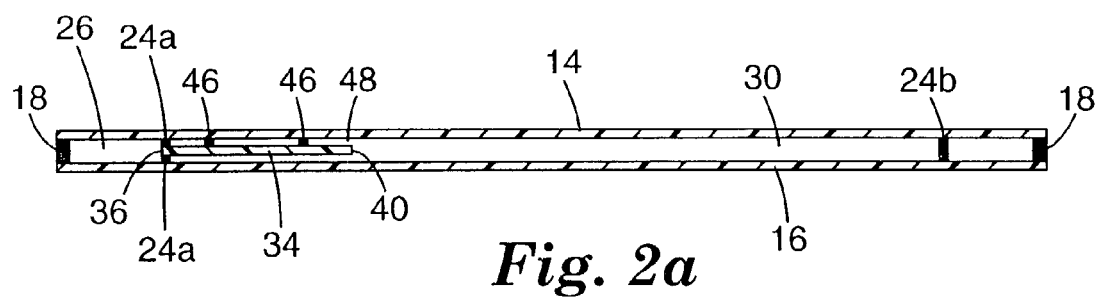
FIG. 2a is a cross-sectional view of the inflatable member of FIG. 1 taken along line 2a—2a of FIG. 1.

As further shown in FIGS. 1–2a, in one preferred embodiment, inflatable cells 30 and a second section 29 of peripheral inflatable chamber 26 include a one way valve system 32 to retain air in the respective cell and/or chamber once packaging system 10 is inflated. One way valve 32 is formed by connecting a third polymeric layer 34 (shown in FIGS. 2–2a) to first layer 14 with a series of heat seals which will be further described herein.

In one preferred embodiment, valve 32 is formed by positioning third layer 34 between first layer 14 and second layer 16. Third layer 34 has a length, defined by edges 36 and 40, that is generally equal to that of first and second layers 14 and 16, but third layer 34 has a width, defined by opposing end edges 42 and 44, that is less than that of first and second layers 14 and 16. Valve 32 is formed by spacing edge 36 of third layer 34 from peripheral heat seal segment 18a. Edge 36 is then sealed relative to first layer 14 and second layer 16 by heat seal segment 24a. Heat seal segment 24a completely seals edge 36 of third layer 34 to second layer 16. At intervals corresponding to each inflatable cell 30 and second section 29 of inflatable chamber 26, however, one of the opposing surfaces of either first layer 14 or third layer 34 is treated with a heat resistant material (e.g., ink or paint) along heat seal segment 24a to prevent heat sealing at the treated sites and thereby define air inlets 38.

Edge 40 of third layer 34 is connected to first layer 14 by a heat seal that spans inflatable cells 30 (interrupted by outlets 48 as described below). Opposing end edges 42 and 44 of third layer 34 are interconnected by heat seal to first layer 14 and second layer 16 along the perimeter heat seal segments 18b and 18c, respectively. Third layer 34 is further connected to first layer 14 with a series of heat welds 46 which are generally parallel to and spaced from heat seal segment 24a and edge 40 of third layer 34. One of the opposing surfaces of either third layer 34 or first layer 14 is further treated with heat resistant material to prevent welding of third layer 34 and first layer 14 at discreet locations along each heat weld 46 to create a serpentine-like flow path for an inflation medium from inlets 38. Each serpentine-like flow path terminates at an outlet 48 that communicates with an interior of inflatable member 12. Outlets 48 are formed by treating a portion of either first layer 14 or third layer 34 adjacent to edge 40 with a heat resistant material, as previously described.

Inflatable member 12 of packaging system 10 is inflated by applying air through inflation valve 22. The first section 27 of peripheral inflatable chamber 26 communicates with valve 32 via inlet 38. Air flows from peripheral inflatable chamber 26 through each inlet 38 and the respective serpentine flow path defined by segmented heat welds 46 and enters each inflatable cell 30 and section 29 of peripheral inflatable chamber 26 via outlets 48. As inflatable cells 30 and section 29 of peripheral inflatable chamber 26 achieve their maximum inflation, the internal pressure of inflatable cell 30 and inflatable chamber 26 causes opposing surfaces of third layer 34 and first layer 14 to tightly bear against one another and thereby prevent air from escaping inflatable cell 30 and peripheral inflatable chamber 26.

Figure 3:
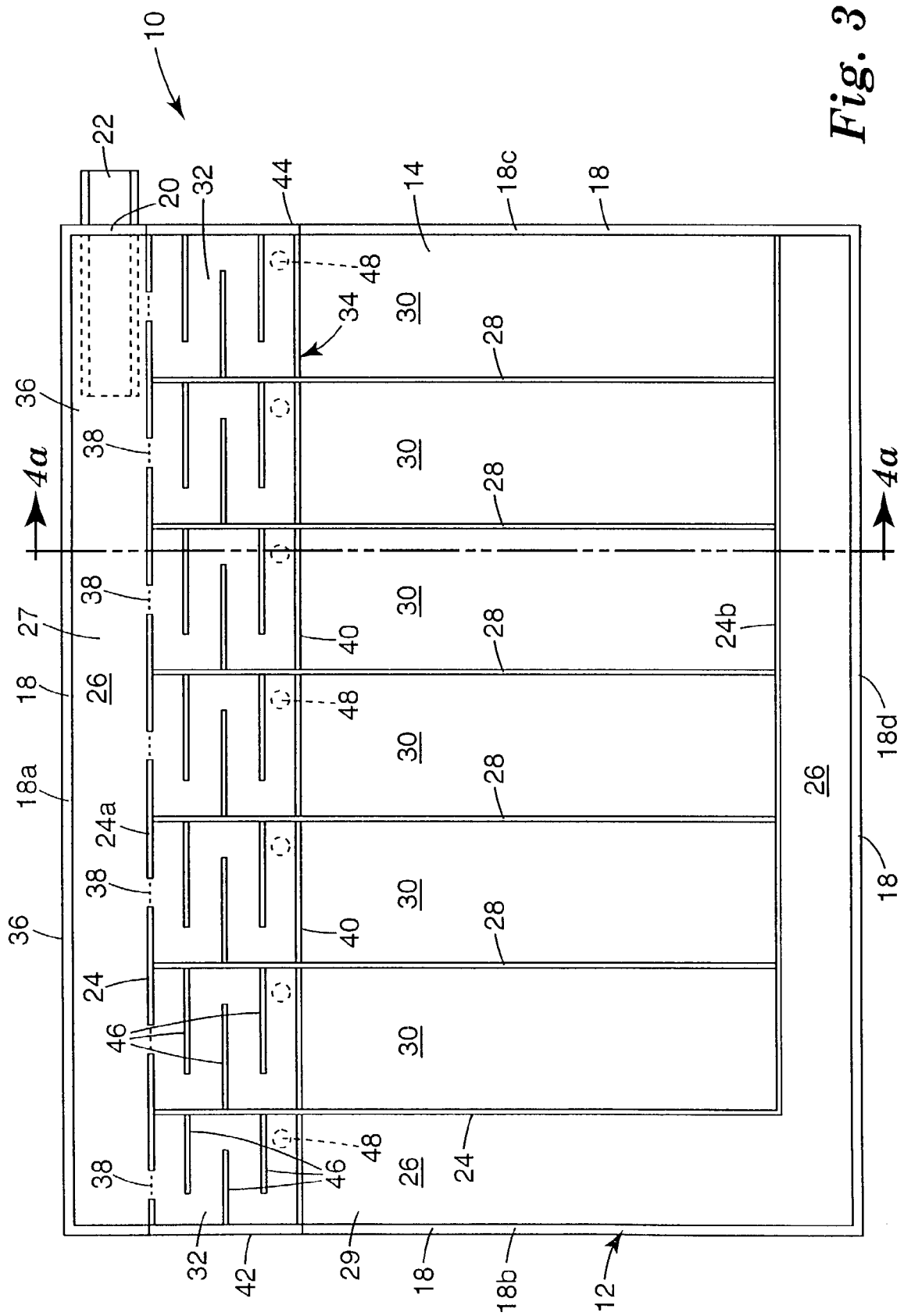
FIG. 3 is a top schematic view of an alternative embodiment of the inflatable member of the present invention.
Figure 4:
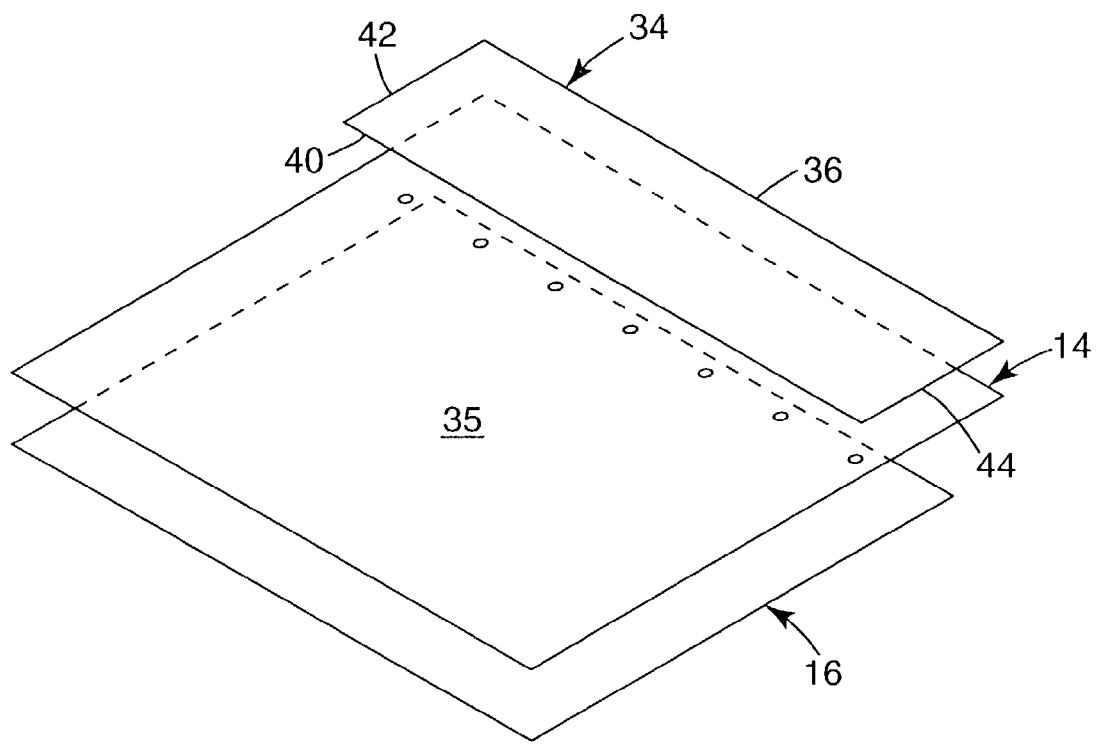
FIG. 4 is an exploded perspective view of the film layer orientation for the inflatable member of FIG. 3.
Figure 4A:
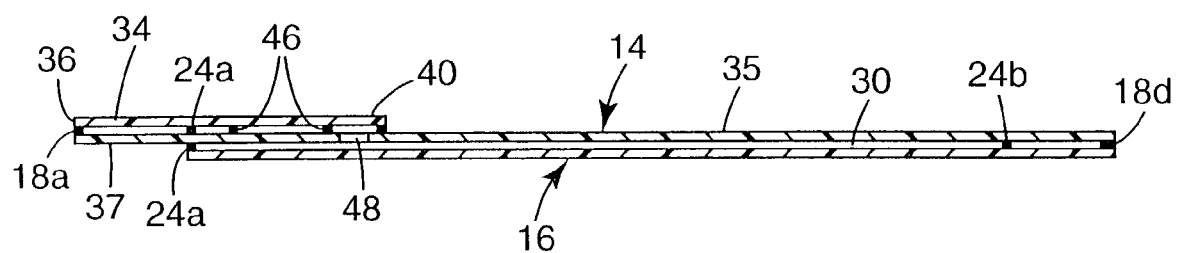
FIG. 4a is a cross-sectional view of the inflatable member of FIG. 3 taken along line 4a—4a of FIG. 3.

As shown in FIGS. 3–4a, in an alternative embodiment, valve 32 may be formed with third layer 34 connected to an outer surface 35 of first layer 14. In this embodiment, second layer 16 is connected to surface 37 of first layer 14 opposite the outer surface 35 of first layer 14. As shown in FIGS. 3–4a, edge 36 of third layer 34 is sealed relative to the edge of first layer 14 along perimeter heat seal segment 18a. A heat seal further connects edges 40 and 42 of third layer 34 to first layer 14. Edge 44 of third layer 34 is sealed relative to first layer 14 with the exception of the small peripheral section 20 that defines an inflation medium inlet, as previously described.

Second layer 16 is dimensioned to have a length defined by perimeter heat seal segments 18b and 18c, and a width defined by heat seal segment 24a and perimeter heat seal segment 18d. The perimeter edges of second layer 16 are connected to first layer 14 by heat seal segments 18b, 18c, 18d and 24a. Heat seal segment 24a also connects first layer 14 and third layer 34, with inlets 38 being formed by treating a portion of either first layer 14 or third layer 34 with a heat resistant material at intervals corresponding to each cell 30 to prevent sealing of adjacent surfaces of first layer 14 and third layer 34 when heat seal segment 24a is formed. Heat welds 46, as described relative to FIG. 1, interconnect third layer 34 to first layer 14 to form the serpentine flow path of valve 32. Outlets 48, however, in the embodiment shown in FIG. 3, are formed by an opening through first layer 14 near the end of the serpentine flow path, as shown in FIG. 4a. As previously described, when inflatable cells 30 and section 29 of peripheral inflatable chamber 26 achieve their maximum inflation, the internal pressure of inflatable cell 30 and inflatable chamber 26 causes opposing surfaces of third layer 34 and first layer 14 to tightly bear against one another and thereby prevent air from escaping inflatable cell 30 and peripheral inflatable chamber 26.

Figure 5:
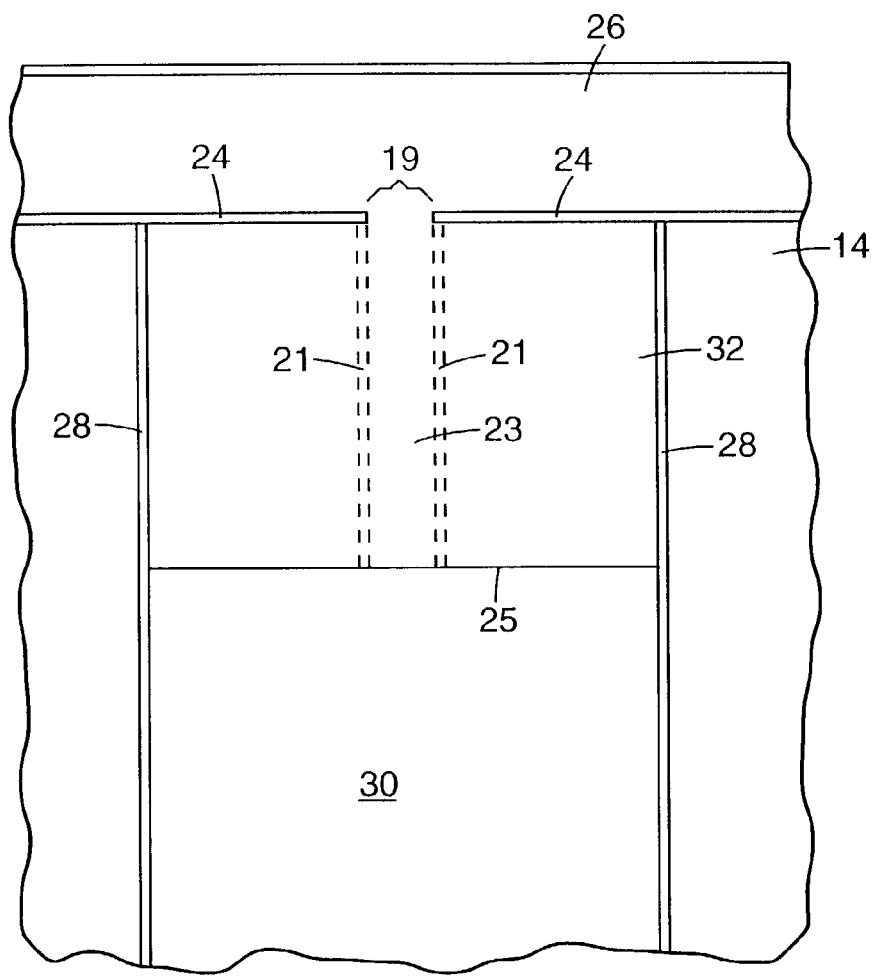
FIG. 5 is an enlarged cutaway view of an inflatable cell of the inflatable member of the present invention with an alternative valve configuration.
Figure 5A:
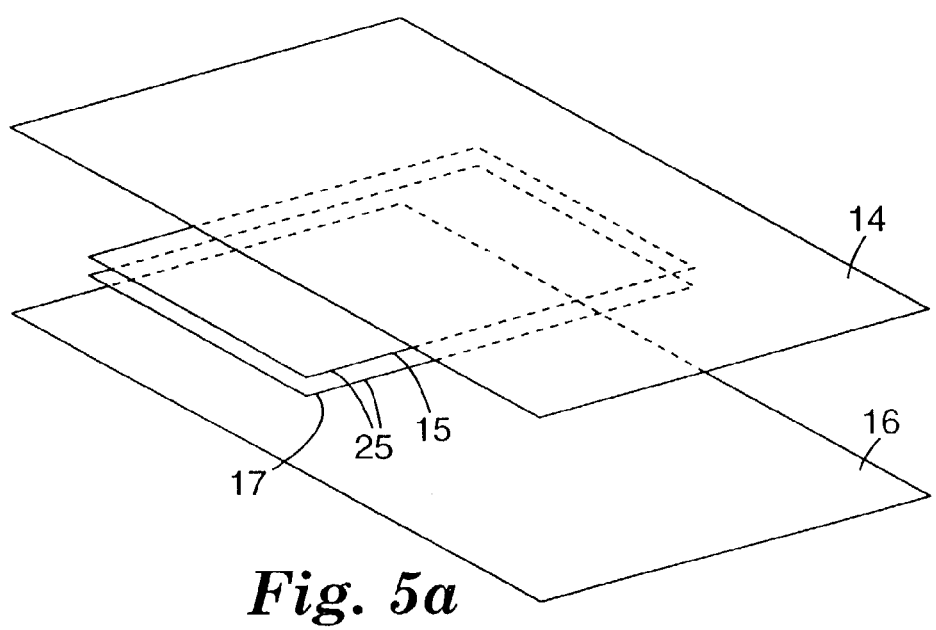
FIG. 5a is an exploded perspective view of the film layer orientation for forming the valve of FIG. 5.

FIG. 5 depicts an alternative embodiment of one way valve 32 for use with packaging system 10. FIG. 5 is an enlarged cutaway view of one of inflatable cells 30. As shown in FIGS. 5 and 5a, the alternative configuration of valve 32 consists of a pair of film layers 15 and 17 positioned between first layer 14 and second layer 16. Layers 15 and 17 of valve 32 are sealed relative to one another and to first and second layers 14 and 16 via heat seals 28 and 24. Opposing edge surfaces of layers 15 and 17 are treated with a heat resistant material along zone 19 to prevent heat sealing and thereby define an air inlet of valve 32. Heat seals 21 further interconnect layers 15 and 17 to define a flow path 23 in communication with inflatable cell 30. Opposing edges 25 of layers 15 and 17 remain unsealed. Thus, air flowing through peripheral inflatable chamber 26 is allowed to enter flow path 23 of valve 32 via the inlet defined by zone 19. Air flowing through pathway 23 enters inflatable cell 30. When inflatable cell 30 reaches maximum inflation, air pressure within inflatable cell 30 urges layers 15 and 17 tight against one another to prevent air from escaping through air pathway 23 and thereby maintain inflatable cell 30 in an inflated state.

One-way valve 32 provides integrity to inflatable member 12 of packaging system 10 by ensuring that an isolated air leak in one region of inflatable member 12 will not result in a complete catastrophic failure of packaging system 10. Inflatable member 12 of packaging system 10 may be also be used, however, without one way valve 32. Packaging system 10 is a simple yet elegant inflatable packaging material capable of a variety of uses. For example, breakable or fragile articles can be placed between multiple sections of inflatable member 12. Further, sections of inflatable member 12 can be sized to line the inner walls of a shipping box to isolate fragile contents from the outer box wall. A further and more novel use of inflatable member 12 will be described herein by reference to FIGS. 6–9.

Figure 6:
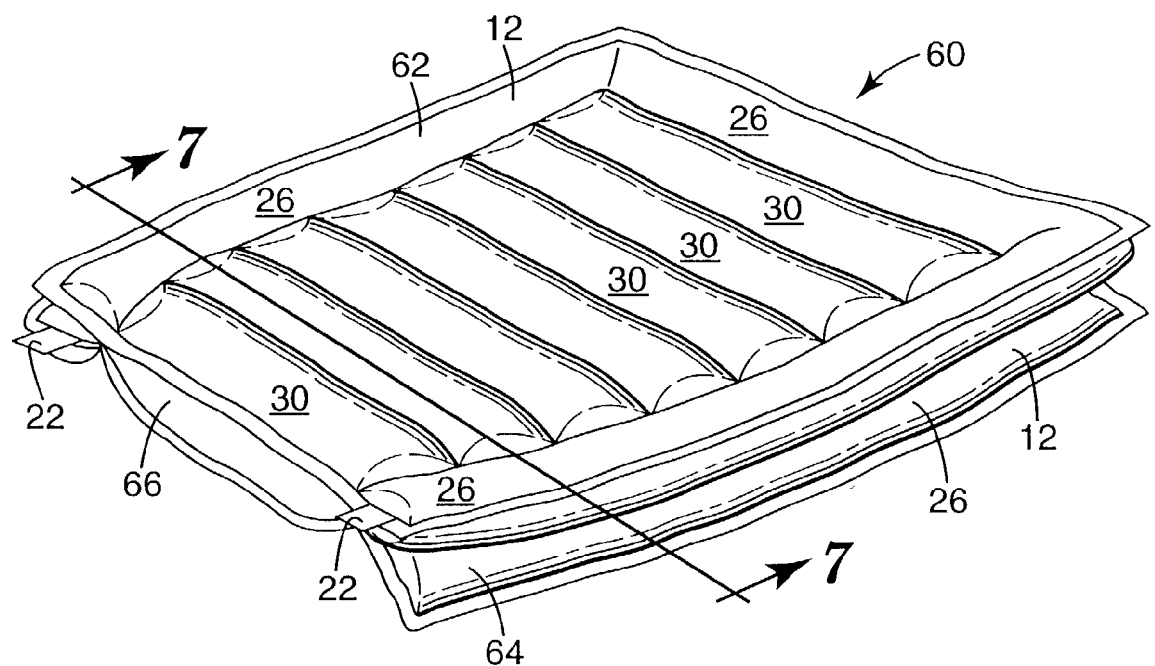
FIG. 6 is a perspective view of a packaging system formed from two inflatable members of FIG. 1.

FIG. 6 is a perspective view of a particularly advantageous application of inflatable member 12 to form an inflatable package protection system 60 for shipping low profile, fragile items. System 60 is generally comprised of an upper section 62 of inflatable member 12 and a lower section 64 of inflatable member 12. System 60 is formed by vertically aligning the peripheral edges of sections 62 and 64, and by interconnecting opposing peripheral surface areas of sections 62 and 64 together on three sides. Interconnected sections 62 and 64 combine to form an envelope-like inflatable container with open end 66 permitting access of a low profile item between sections 62 and 64. While system 60 is shown in an inflated state, it is to be understood that items requiring protection for shipping or storage are inserted through opening 66 and positioned between sections 62 and 64 while system 60 is in a deflated state. Each section 62 and 64 is subsequently inflated through an inflation valve, such as inflation valve 22, as previously described relative to FIG. 1. Inflation of inflatable cells 30 causes opposing inner surfaces of sections 62 and 64 to bear tightly against an article placed within system 60 so as to securely hold the item within the pocket defined between sections 62 and 64. Peripheral inflatable chambers 26 of sections 62 and 64 provide particularly suitable perimeter protection particularly when system 60 is fitted within a shipping box or container.

Figure 7:
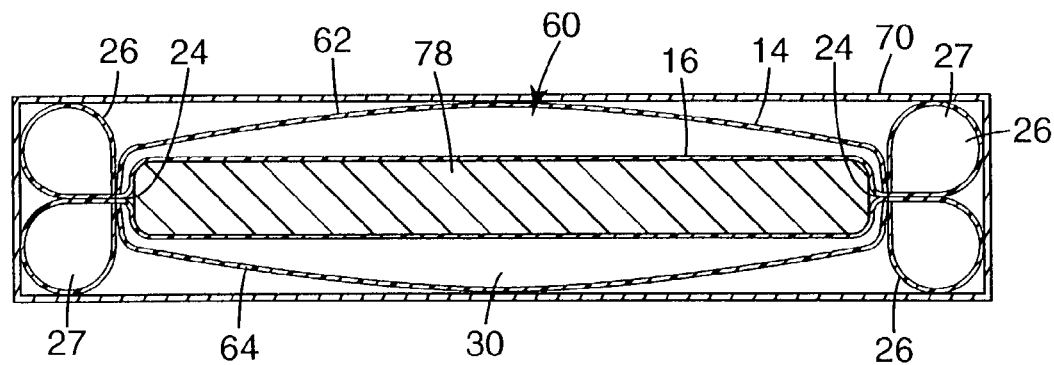
FIG. 7 is a cross-sectional view of the packaging system of FIG. 6 taken along line 7—7 of FIG. 6.

FIG. 7 is a sectional view of system 60 taken essentially along line 7—7 shown in FIG. 6 and further positioned within a shipping container 70. As shown in FIG. 7, section 62 of inflatable member 12 is interconnected to section 64 of inflatable member 12 by heat welding opposing surfaces of sections 62 and 64 together along heat seal 24 (which interconnects layers 14 and 16 of inflatable member 12). To maintain perimeter protection in the event of an air leak in one cell 30 or chamber 26, section 27 of chamber 26 of section 62 is positioned on one side of system 60, while section 27 of chamber 26 of section 64 is positioned on the other side of system 60. Sections 62 and 64 thus interconnected, peripheral inflatable chambers 26 of system 60 provide significant corner and edge protection for an item while maintaining a low profile and maximizing interior pocket size. An item 78 thus secured within system 60 is protected on its top and bottom by inflatable cells 30 and about its periphery by inflatable peripheral chambers 26. System 60 thereby provides a low profile inflatable package protection system that cushions fragile, low profile items, such as picture frames, china plates, or laptop computers and spaces such items from the walls of a shipping container 70, as shown in FIG. 7.

Figure 8:
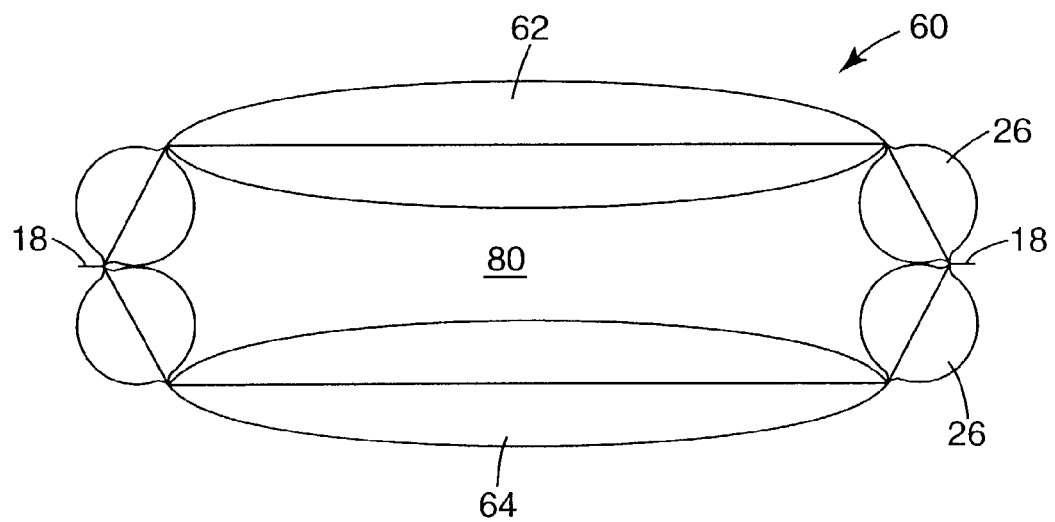
FIG. 8 is a schematic end view of an alternative packaging system configuration formed from two inflatable members of the present invention.

FIG. 8 is an end view of an alternative embodiment of packaging system 60. The embodiment of packaging system 60 shown in FIG. 8 differs from that shown in FIGS. 6 and 7 in that opposing surfaces of peripheral inflatable chambers 26 of sections 62 and 64 are interconnected about the periphery of inflatable member 12 adjacent to heat seal 18. The resulting configuration of packaging system 60 thereby incorporates a greater pocket area 80 to accommodate larger items.

Figure 9:
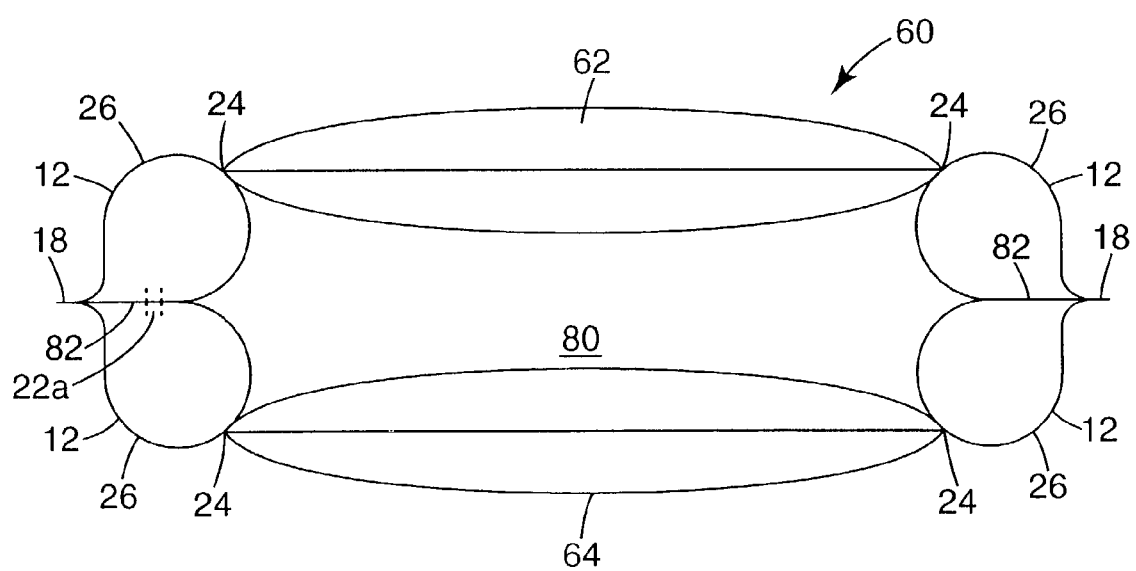
FIG. 9 is a schematic cross-sectional view of the alternative packaging system of FIG. 8.

The particular interconnection of opposing sections 62 and 64 is more clearly shown in FIG. 9. As shown in FIG. 9, opposing surfaces of peripheral inflatable chamber 26 are interconnected along a zone of adhesion generally referred to by reference numeral 82. In one embodiment, adhesion zone 82 generally extends from heat seal 18 to a distance that generally corresponds to the radius of peripheral inflatable chamber 26 when inflatable member 12 is fully inflated. This in turn results in greater spacing between heat seal 24 of inflatable member 12 forming section 62 and heat seal 24 of inflatable member 12 forming section 64, which in turn results in a larger pocket 80 of packaging system 60. In alternative embodiments, the size of pocket 80 can be adjusted by varying the location of adhesion zone 82. Locating adhesion zone closer to heat seal 24 results in a smaller pocket 80, and conversely, locating adhesion zone 82 closer to heat seal 18 results in a larger pocket 80. Packaging system 60 formed in the manner shown in FIGS. 8 and 9 thereby is able to accommodate items of various dimensions. Furthermore, it is possible to allow inflatable member 12 of section 62 to communicate with inflatable member 12 of section 64 by providing an inflation hole 22a (shown in dotted lines in FIG. 9) between respective sections 26 of sections 62 and 64 (and any additional sections of inflatable member 12) along adhesion zone 82. The employment of inflation hole 22a permits multiple sections of inflatable member 12 to be inflated by a single inflation valve 22 associated with one of the inflatable members 12.

Figure 10:
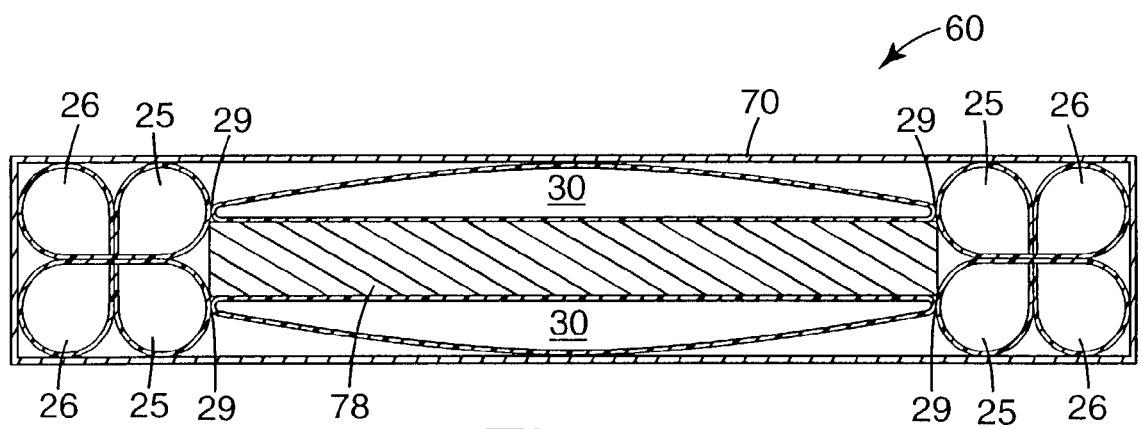
FIG. 10 is a cross-sectional view of the packaging system of FIG. 6 with enhanced perimeter protection.

FIG. 10 is a cross-section view of another embodiment of the packaging system 60 in which perimeter protection is further enhanced by the formation of secondary perimeter inflation zones 25 adjacent to peripheral inflatable chambers 26. Perimeter inflation zones 25 are formed by an additional heat seal 29 of each layer 14 and 16 which is spaced from and generally parallel with heat seal 24. Segments of layers 14 and/or 16 corresponding to heat seal 29 are treated with a heat resistant material along heat seal 29 in the manner previously described sufficient to form gaps in heat seal 29 and thereby allow the inflation medium to fill inflatable cells 30 and perimeter inflation zones 25. Perimeter inflation zones 25 combined with peripheral inflatable chambers 26 increase the edge distance of item 78 from shipping container 70 and provide enhanced cushioning for the perimeter edges of fragile items.

Figure 11:
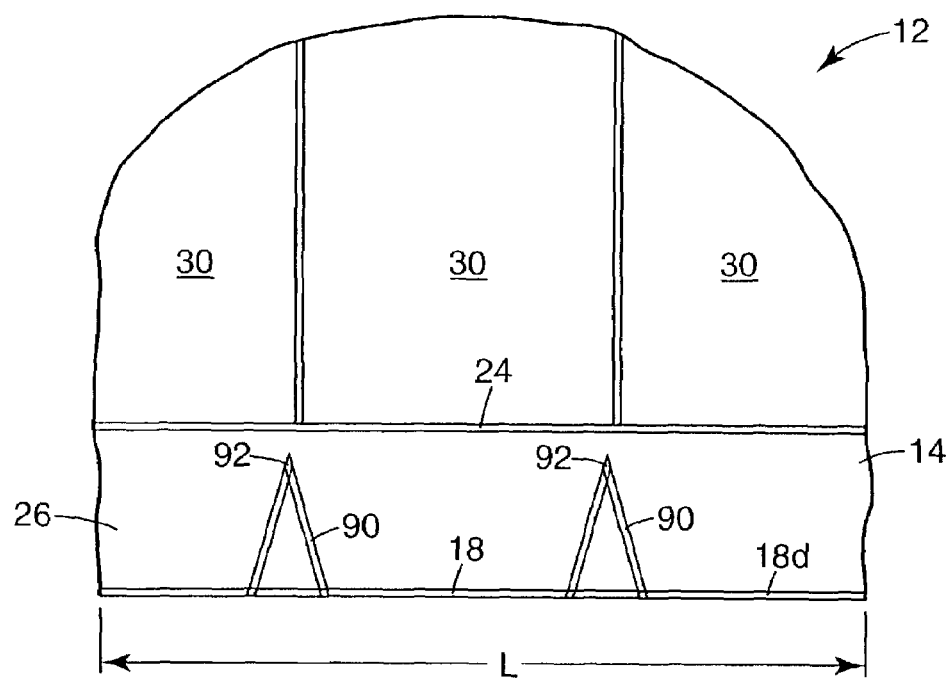
FIG. 11 is an enlarged schematic cutaway view of a segment of the inflatable member of FIG. 1 incorporating pleats in the peripheral inflatable chamber.

FIG. 11 is an enlarged cutaway view of a segment of an inflatable member 12 relative to inflatable cell 30 and that portion of peripheral inflatable chamber 26 extending transverse to inflatable cells 30. FIG. 11 depicts a modification to the formation of peripheral inflatable chamber 26 to minimize buckling of inflatable chamber 26 when inflatable member 12 is fully inflated. As cells 30 of inflatable member 12 inflate, the length L of inflatable member 12 decreases. In response to this decrease in length, inflatable chamber 26 has a tendency to buckle or crimp at one or more locations along the length L of inflatable member 12, which can cause inflatable member 12 to curl along its length. To compensate for this buckling or crimping effect of inflatable chamber 26, one or more pleats 90 are formed by a V-shaped heat weld of the opposing surfaces of first layer 14 and second layer 16 along heat seal segments 18a and 18d. As shown in FIG. 11, pleats 90 extend from heat seal 18 to a point 92 that is sufficiently spaced from heat seal 24 to allow air to flow through peripheral inflatable chamber 26. Pleats 90 aid in adjusting for the reduction in length of inflatable member 12 upon full inflation so as to maintain a more uniform peripheral shape at regions of inflatable chamber 26 prone to buckling. It is to be appreciated that the number and size of pleats may be varied to accommodate varying lengths and sizes of inflatable member 12.

While a novel packaging system has been described herein to be comprised of two, interconnected sections of inflatable members 12, it is intended to be understood that other packaging systems having two or more pocket openings may be formed by interconnecting three or more sections of inflatable members 12 employing the teachings herein. Sections of inflatable members 12 may be arranged and interconnected in a manner to orient the pocket openings on a common end of the packaging system. Alternatively, the interconnection of sections of inflatable members 12 may be located to vary the orientation of each pocket opening defined between two contiguous sections of inflatable members 12.

Figure 12:
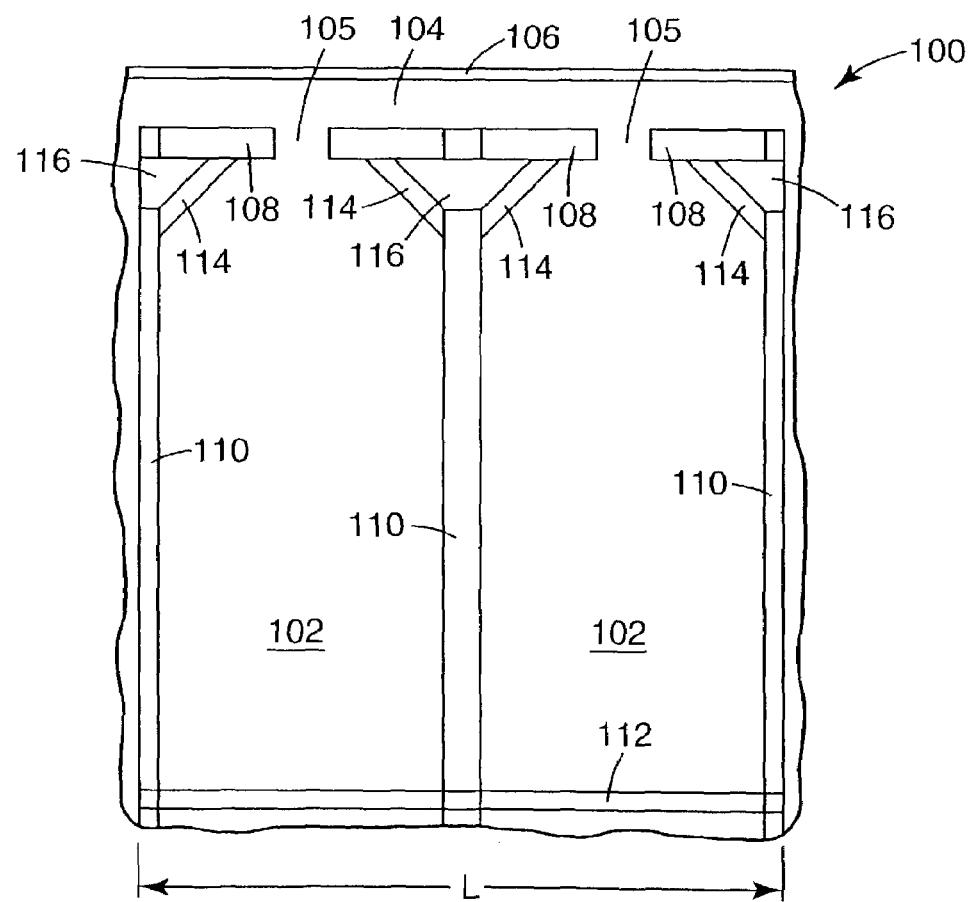
FIG. 12 is a partial top schematic view of an alternative multi-cell packaging system of the present invention

FIG. 12 is a partial top view of an alternative multi-cell packaging system 100, which is formed from two film layers in a manner similar to system 10 of FIG. 1. As shown in FIG. 12, system 100 comprises a plurality of inflatable cells 102 each of which communicates with a common air passageway or header 104 via inlets 105. Header 104 is formed by a first edge heat seal 106 and a spaced, generally parallel heat seal 108, which interconnect the two film layers. Header 104 is open at one end to permit the introduction of an inflation medium, such as air. Alternatively, header 104 can communicate with a filler valve (not shown) which is similar to valve 22 of FIG. 1. The width of header 104 may be varied along the length of system 100 to facilitate inflation of cells 102 downstream from the initial introduction of an inflation medium into the header 104, in which case heat seals 106 and 108 will not be parallel.

Inlets 105 are formed by treating sections of the inner surfaces of the two film layers where heat seal 108 is to be made with a heat resistant material, in the manner previously described. Cells 102 are formed by spaced and generally parallel heat seals 110, which extend from and are transverse to heat seal 108, and by a second edge heat seal 112 that is generally parallel to the first edge seal 106. While only two cells 102 are shown in FIG. 12, it is to be understood that system 100 may comprise any desirable number of cells. Cells 102 may be inflated in a particular order, i.e., last to first, or first to last, by varying the width of inlets 105 of each cell 102. Inflation medium will flow through wider inlets first. Inlets 105 may vary in width by as little as 0.0125 inch to see this effect.

As the number of cells in system 100 increase, the ability to inflate downstream cells 102 can be significantly impacted as the initial cells 102 inflate and shorten the length L of system 100. This shortening of system 100 due to inflation of cells 102 causes a strain along seal 108, which causes a buckling or creasing of the header that can lead to a blockage of air flow to downstream cells. To alleviate this buckling tendency, in one preferred embodiment, each cell 102 is formed to include a pair of heat seals 114 that extend at an angle between heat seals 110 and heat seal 108 adjacent to an intersection of seals 110 and 108. As is seen in FIG. 12, seals 114, 110 and 108 isolate an area 116, which is then cut out and removed to form a void between adjacent cells 102 near the header 104. These cut outs relieve the strain along seal 108 and sufficiently reduce buckling of the header to ensure adequate air flow through the header to downstream cells 102 of system 100.

Figure 13:
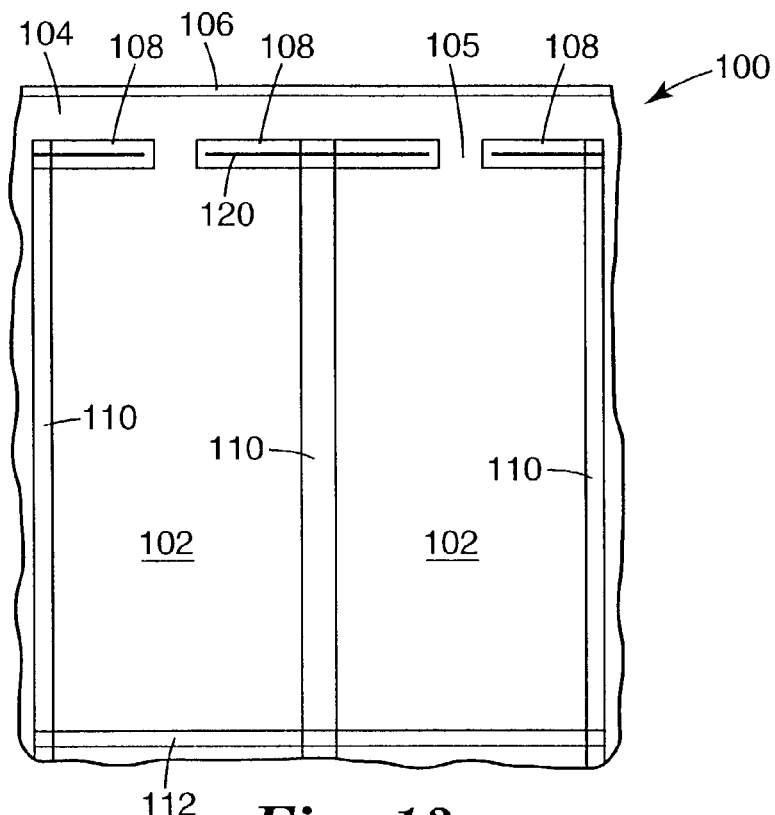
FIG. 13 is a first alternative embodiment of the packaging system of FIG. 12.

As shown in FIG. 13, a first alternative embodiment of system 100 is demonstrated that reduces the buckling effect of the header upon inflation of cells 102. According to the embodiment of FIG. 13, heat seals 110 bisect heat seal 108. Each segment of heat seal 108 is then provided with a slit 120, which isolates the inflation induced dimensional changes of cells 102 from header 104 and alleviates the buckling effect along seal 108.

Figure 14:
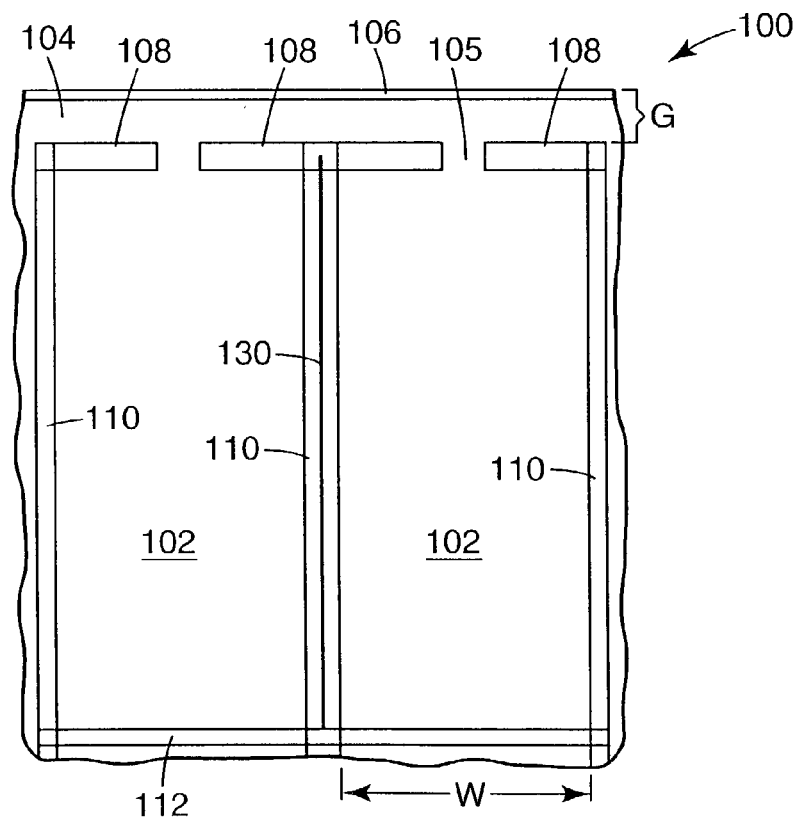
FIG. 14 is a second alternative embodiment of the packaging system of FIG. 12.

A second alternative embodiment of system 100 is shown in FIG. 14. As shown in FIG. 14, system 100 is in a deflated state. Each heat seal 110 that separates adjacent cells 102 is provided with a central cut 130 that extends between seal 108 and seal 112. This central cut 130 permits each cell 102 to individually reduce in width W as cells 102 are inflated, such that a gap between adjacent cells 102 forms along cut 130. Thus, cut 130 relieves the strain along seal 108 and prevents header 104 from buckling.

Each cell 102 of system 100 may also incorporate a one way valve, like one way valve 32 described relative to FIGS. 1–5a. In such an event, individual inflated cells 102 can be severed from system 100 without destroying the continuity of system 100, such as by extending cut 130 beyond seals 106 and 112. In this manner, system 100 can have a length defined by any desirable number of cells 102 to accommodate objects of differing sizes. System 100 can be inflated and wrapped around an object that is to be shipped in a shipping container or box. Once inflated, additional individual cells 102 can be separated from system 100 and used to fill any remaining voids in the shipping container. System 100 may, for example, be formed in a roll of a plurality of cells 102. A desired number of cells 102 may be selected and severed from the roll, resulting in a header 104 that is unsealed, as shown in FIG. 14. In such an event, the gap G between seal 106 and seal 108 at one end of the header 104 is either permanently closed with a heat seal, or temporarily closed with a clamp prior to inflation of the selected cells 102.

Figure 15:
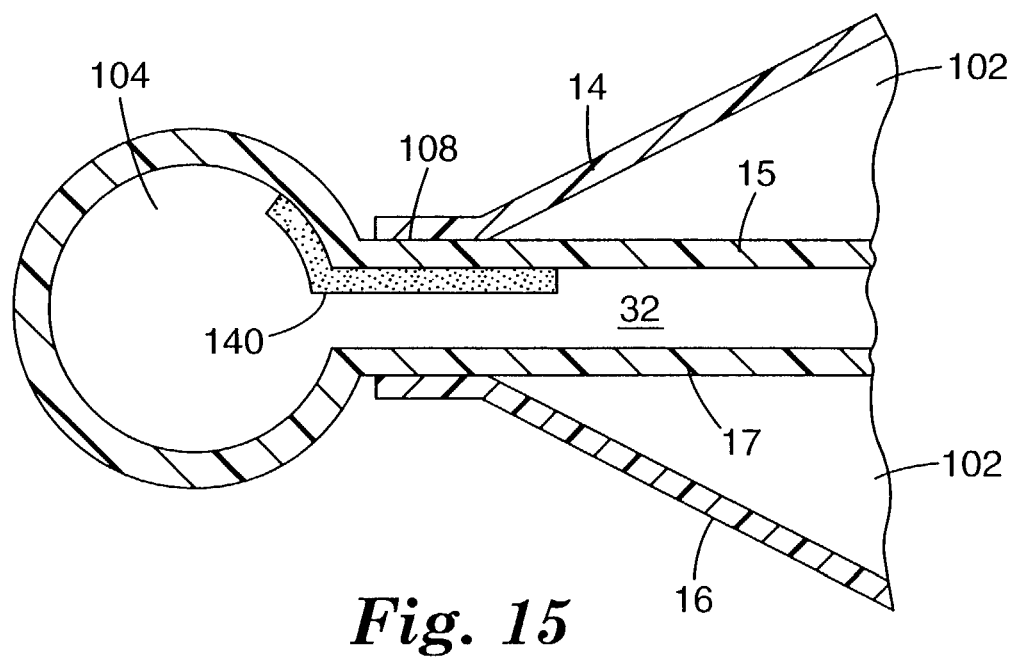
Figure 16:
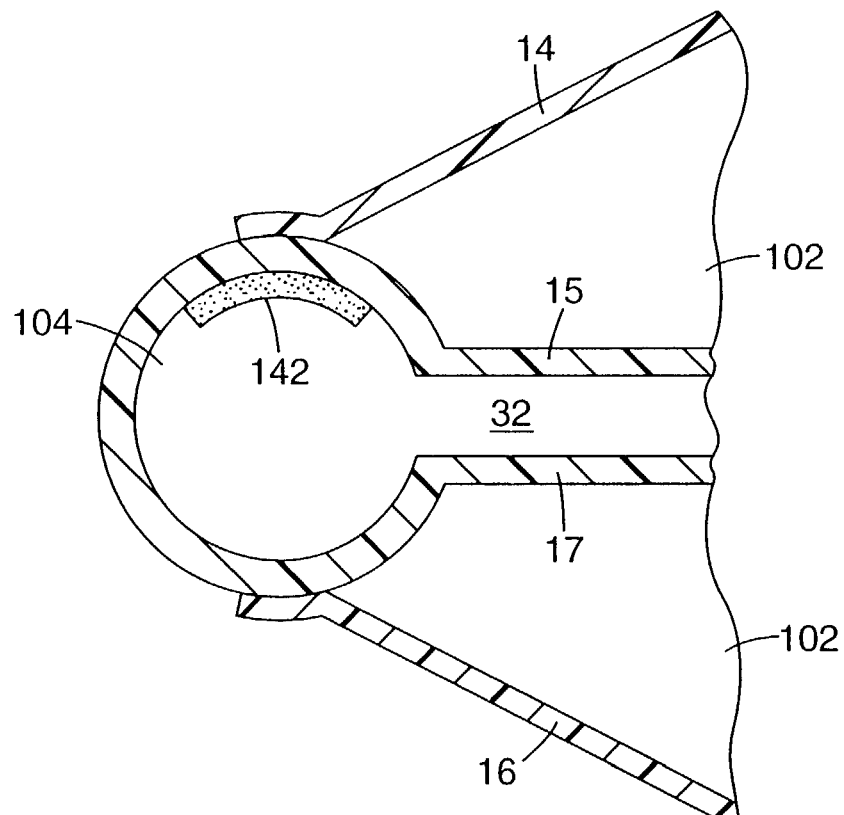

FIGS. 15 and 16 are cross-sectional views of system 100 which incorporate a one way valve 32 previously described relative to FIGS. 5–5a. As shown in FIGS. 15 and 16, the header 104 is formed by layers 15 and 17 of valve 32, which may, as shown in FIGS. 15 and 16 be a continuous sheet of material. In FIG. 15, layers 14 and 16 are shown heat sealed to layers 15 and 17 along heat seal 108. A heat resistant material, such as heat resistant material layer 140 on layer 15, is applied at the location of inlets 105 to prevent sealing of layers 15 and 17 at those locations. As shown in FIG. 16, alternatively layers 14 and 16 can be sealed relative to surfaces of layers 15 and 17 adjacent to header 104. Heat resistant material layer 142 is applied to layer 15 and/or 17 along header 104 to prevent sealing of layers 15 and 17 along header 104. The embodiment of FIG. 15 may be utilized with any of the embodiments of system 100 shown in FIGS. 12–14, while the embodiment of FIG. 16 is particularly suited for use with the embodiment of system 100 shown in FIG. 14. The embodiments of FIGS. 15 and 16 enable the formation of a header and one way valve 32 in one construction which can subsequently be combined with a construction corresponding to inflatable cells 102 to form system 100 of any desired length.

Although the present invention has been described with reference to preferred embodiments, workers skilled in the art will recognize that changes may be made in form and detail without departing from the spirit and scope of the invention. Also, various permutations of the present invention are possible by exchanging corresponding features of the various embodiments.

What is claimed is:

1. In a multi-chambered inflatable packaging system having overlying first and second film layers connected together around a perimeter of the first and second layers by a perimeter seal except for a gap sufficient in size to allow an inflation medium to be introduced into an interior defined between the first and second film layers, an inflation channel formed by a first seal of the first and second film layers adjacent a portion of the perimeter, wherein the inflation channel is in fluid communication with the gap, a plurality of separate inflatable cells in fluid communication with the inflation channel, the plurality of inflatable cells formed by plurality of spaced second seals extending from and transverse to the first seal, the improvement comprising:

means for maintaining airflow through the inflation channel as the plurality of inflatable cells are inflated, wherein the means for maintaining airflow comprises a corner seal of the first and second film layers between the first seal and each second seal, the corner seal isolating a portion of the first and second film layers from fluid communication with the inflation channel and each inflatable cells, wherein the portion is thereafter removed to create a void.

* * * * *